US012476790B2

(12) United States Patent
Karame et al.

(10) Patent No.: US 12,476,790 B2
(45) Date of Patent: Nov. 18, 2025

(54) METHOD FOR SIGNING A NEW BLOCK IN A DECENTRALIZED BLOCKCHAIN CONSENSUS NETWORK

(71) Applicant: NEC Laboratories Europe GmbH, Heidelberg (DE)

(72) Inventors: Ghassan Karame, Heidelberg (DE); Wenting Li, Heidelberg (DE); Giorgia Azzurra Marson, Heidelberg (DE); Jens-Matthias Bohli, Heidelberg (DE); Sebastien Andreina, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 18/344,911

(22) Filed: Jun. 30, 2023

(65) Prior Publication Data

US 2023/0344619 A1 Oct. 26, 2023

Related U.S. Application Data

(63) Continuation of application No. 16/650,389, filed as application No. PCT/EP2018/075692 on Sep. 21, 2018, now Pat. No. 11,736,271.

(51) Int. Cl.
*H04L 29/06* (2006.01)
*H04L 9/06* (2006.01)
(Continued)

(52) U.S. Cl.
CPC .......... *H04L 9/0637* (2013.01); *H04L 9/3236* (2013.01); *H04L 9/3297* (2013.01); *H04L 9/50* (2022.05)

(58) Field of Classification Search
None
See application file for complete search history.

(56) References Cited

U.S. PATENT DOCUMENTS

2008/0310749 A1   12/2008   Liao et al.
2015/0310424 A1   10/2015   Myers
(Continued)

FOREIGN PATENT DOCUMENTS

CN   105790954 A   7/2016
CN   106453636 A   2/2017
(Continued)

OTHER PUBLICATIONS

Xusheng Chen et al: "GEEC: Scalable, Efficient, and Consistent Consensus for Blockchains", arxiv.org, Cornell University Library, 201 Olin Library Cornell University Ithaca, NY 14853, Aug. 7, 2018 (Aug. 7, 2018), XP080905599 (Year: 2018).*
(Continued)

*Primary Examiner* — Andrew J Steinle
(74) *Attorney, Agent, or Firm* — Leydig, Voit & Mayer, Ltd.

(57) ABSTRACT

A method for registering a mining computing entity (MCE) with a trusted execution environment entity (TEEE) in a blockchain of a distributed blockchain consensus network (DBCN), based on a proof-of-stake protocol, includes determining public signing information, secret signing information, and a registration timestamp and determining public account information and secret account information for a virtual wallet of the blockchain. The method further includes generating attestation information based on signing integrity information and hashing the public signing information and the public account information, and based on the attestation information, obtaining, from an attestation providing entity (APE), proving information. The method also includes sending, to the blockchain, a registration transaction that is signed with the secret account information, and registering the MCE to the blockchain.

20 Claims, 7 Drawing Sheets

(51) Int. Cl.
*H04L 9/32* (2006.01)
*H04L 9/00* (2022.01)

(56) References Cited

U.S. PATENT DOCUMENTS

| | | |
|---|---|---|
| 2016/0358169 A1 | 12/2016 | Androulaki et al. |
| 2017/0046651 A1 | 2/2017 | Lin et al. |
| 2017/0075941 A1 | 3/2017 | Finlow-Bates |
| 2017/0236094 A1 | 8/2017 | Shah |
| 2017/0346693 A1 | 11/2017 | Dix et al. |
| 2018/0109541 A1 | 4/2018 | Gleichauf |
| 2018/0130050 A1 | 5/2018 | Taylor et al. |
| 2018/0137503 A1 | 5/2018 | High et al. |
| 2019/0043050 A1 | 2/2019 | Smith et al. |
| 2019/0073645 A1 | 3/2019 | Dazin |
| 2019/0268142 A1 | 8/2019 | Leker et al. |
| 2019/0363892 A1 | 11/2019 | Wang |
| 2020/0278963 A1 | 9/2020 | Destefanis et al. |
| 2021/0119778 A1 | 4/2021 | Cheng et al. |
| 2021/0176058 A1 | 6/2021 | Cheng |
| 2021/0263907 A1 | 8/2021 | Krueger |
| 2021/0314143 A1 | 10/2021 | Conner |

FOREIGN PATENT DOCUMENTS

| | | |
|---|---|---|
| CN | 106504008 A | 3/2017 |
| WO | 2018/041066 A1 | 3/2018 |

OTHER PUBLICATIONS

Li Wenting et al: "Securing Proof-of-Stake Blockchain Protocols", Sep. 13, 2017 (Sep. 13, 2017), Image Analysis and Recognition: 11th International Conference, ICIAR 2014, Vilamoura, Portugal, Oct. 22-24, 2014, Proceedings, Part I; In: Lecture Notes in Computer Science, ISSN 1611-3349; vol. 8814; (Year: 2014).*

Mitar Milutinovic et al: "Proof of Luck: an Efficient Blockchain Consensus Protocol", arxiv.org, Cornell University Library, 201 Olin Library Cornell University Ithaca, NY 14853, Mar. 16, 2017 (Mar. 16, 2017), XP080757306, DOI: 10.1145/3007788.3007790 (Year: 2017).*

Chen, Xusheng et al. "GEEC: Scalable, Efficient, and Consistent Consensus for Blockchains," arXiv.org, Cornell University Library, 201 Olin Library Cornell University Ithaca, NY, 14853, Aug. 7, 2018, XP080905599.

Li, Wenting et al. "Securing Proof-of-Stake Blockchain Protocols," Sep. 13, 2017.

Milutinovic, Mitar et al. "Proof of Luck: an Efficient Blockchain Consensus Protocol," arXiv.org, Cornell University Library, 201 Olin Library Cornell University Ithaca, NY 14853, Mar. 16, 2017, XP080757306.

Andreina, Sebastien et al. "PoTS—A Secure Proof of TEE-Stake for Permissionless Blockchains," IACR, vol. 20181129:030034, Nov. 21, 2018, pp. 1-19, XP061027007.

Jesus, Emanuel Ferreira et al. "A Survey of How to Use Blockchain to Secure Internet of Things and the Stalker Attack," Hindawi, Security and Communication Networks, vol. 2018, Article ID 9675050, Apr. 8, 2018.

King, Sunny and Scott Nadal, "PPCoin: Peer-to-Peer Crypto-Currency with Proof-of-Stake," Aug. 19, 2012.

Ahmed, Mansoor and Kari Kostiainen, "Identity Aging: Efficient Blockchain Consensus," arXiv:1804.07391v1, Apr. 19, 2018.

Wang, Wenbo et al. "A Survey on Consensus Mechanisms and Mining Strategy Management in Blockchain Networks," arXiv:1805.02707v4, Feb. 19, 2019.

Bitcoin, "Bitcoin Developer Guide: Block Chain," Aug. 10, 2018.

Kiayias, Aggelos et al. "Ouroboros: A Provably Secure Proof-of-Stake Blockchain Protocol," Jul. 20, 2019.

Zhang, Fan et al. "REM: Resource-Efficient Mining for Blockchains," Proceedings of the 26th USENIX Security Symposium, Aug. 16-18, 2017, Vancouver, BC, Canada.

* cited by examiner

METHOD FOR SIGNING A NEW BLOCK IN A DECENTRALIZED BLOCKCHAIN CONSENSUS NETWORK

CROSS-REFERENCE TO PRIOR APPLICATIONS

This application is a continuation of U.S. application Ser. No. 16/650,389 filed on Mar. 25, 2020, which is a U.S. National Phase application under 35 U.S.C. § 371 of International application Ser. No. PCT/EP2018/075692, filed on Sep. 21, 2018. The entire contents of these applications are hereby incorporated by reference herein.

FIELD

The present invention relates to a method for registering a mining computing entity, 'MCE' with a trusted execution environment entity, 'TEEE' in a blockchain of a distributed blockchain consensus network, 'DBCN', based on a proof-of-stake protocol.

The present invention further relates to a system for registering a mining computing entity, 'MCE' with a trusted execution environment entity, 'TEEE' in a blockchain of a distributed blockchain consensus network, 'DBCN', based on a proof-of-stake protocol, said system comprising said MCE, an attestation providing entity, 'APE', and a node of said DCBN.

The present invention even further relates to a non-transitory computer readable medium storing a program causing a computer to execute a method for registering a mining computing entity, 'MCE' with a trusted execution environment entity, 'TEEE' in a blockchain of a distributed blockchain consensus network, 'DBCN' based on a proof-of-stake protocol, 'POS'.

The present invention further relates to a method for mining a new block in a blockchain of a distributed blockchain consensus network, 'DBCN' based on a proof-of-stake protocol.

The present invention further relates to a system for mining a new block in a blockchain of a distributed blockchain consensus network, 'DBCN', based on a proof-of-stake protocol, said system comprising a peer of said blockchain and a mining computing entity, 'MCE' with a trusted execution environment entity, 'TEEE'.

The present invention even further relates to a non-transitory computer readable medium storing a program causing a computer to execute a method for mining a new block in a blockchain of a distributed blockchain consensus network, 'DBCN' based on a proof-of-stake protocol.

The present invention further relates to a mining computing entity, 'MCE', with a trusted execution environment entity, 'TEEE', to be registered in a blockchain of a distributed blockchain consensus network, 'DBCN' based on a proof-of-stake protocol.

Although applicable to any application based on the blockchain principle, the present invention will be described with regard to the application in form the cryptocurrency BitCoin.

BACKGROUND

Bitcoin is a decentralized payment system and is currently gaining popularity as a digital currency; several businesses are starting to accept Bitcoin transactions. For instance, Bitcoins were used as a form of fast payment in a local fast-food restaurant.

Bitcoin is a Proof-of-Work (POW) based currency that allows users to "mine" for digital coins by performing computations. Users execute payments by digitally signing their transactions and are prevented from double-spending their coins (i.e., signing-over the same coin to two different users) through a distributed time-stamping service. This service operates on top of the Bitcoin Peer-to-Peer (P2P) network that ensures that all transactions and their order of execution are available to all Bitcoin users.

To reach distributed agreement, the blockchain relies on consensus protocols which ensure that all nodes in the network share a consistent view on a common distributed ledger. As BitCoin, most conventional blockchain systems rely on Proof-of-Work (PoW) principle to reach network consensus in permission-less systems that do not require the knowledge of nodes' identities. However, the Proof-of-Work consumes a lot of energy; for instance, it is estimated that Bitcoin miners can consume as much electricity as Ireland in 2005 and in 2018 the consumption is estimated to be comparable to Austria.

To remedy this problem, Proof of Stake (PoS) protocols can be used offering a more efficient and environment-friendly alternative. Unlike PoW, PoS leverages virtual resources such as the stake of a node in order to perform leader election and maintain consensus in the network. Since the mining resources are virtual, PoS-based consensus process is instant and results in negligible costs.

SUMMARY

In an embodiment, the present invention provides a method for registering a mining computing entity (MCE) with a trusted execution environment entity (TEEE) in a blockchain of a distributed blockchain consensus network (DBCN), based on a proof-of-stake protocol. The method includes determining public signing information, secret signing information, and a registration timestamp, determining public account information and secret account information for a virtual wallet of the blockchain, generating attestation information based on signing integrity information and hashing the public signing information and the public account information, based on the attestation information, obtaining, from an attestation providing entity (APE), proving information, and sending, to the blockchain, a registration transaction that is signed with the secret account information. The registration transaction comprises the public signing information and the proving information from the APE. The method also includes registering the MCE to the blockchain based on the registration transaction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
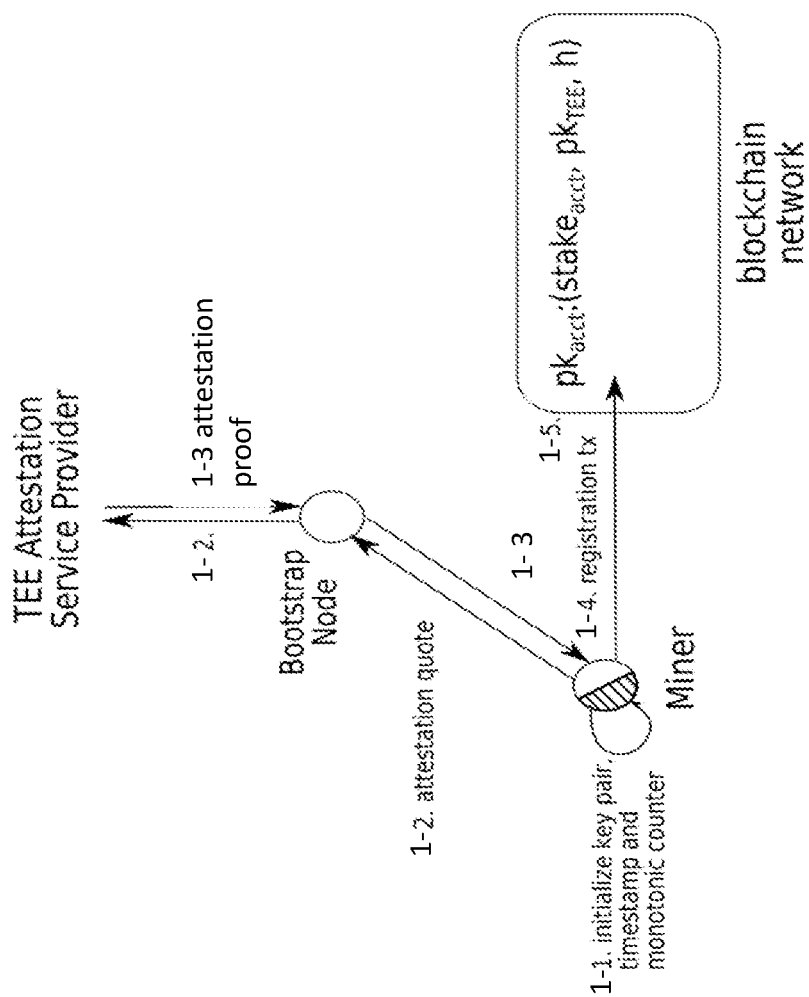
FIG. 1 shows steps of a method according to an embodiment of the present invention.

Conventional PoS protocols are vulnerable to a number of security threats, such as the nothing-at-stake attack, the long-range attack and the stake-bleeding attack.

The nothing-at-stake attack allows the nodes to mine conflicting blocks without risking their stake which increases the number of forks in the system as well as the time to reach consensus in the network. The long-range attack, also commonly referred to as history-attack comprises an adversary that aims to alter the entire history of the blockchain starting from early blocks, even from the genesis block. The stake-bleeding attack is another way to achieve the history-attack by creating a branch from an early block of the blockchain. The created branch includes all the transactions from the main blockchain and collects the corresponding transaction fees. To a certain point, the attacker is able to accumulate majority amount of stake and thus controlling the block generation from then on.

Embodiments of the present invention increase the efficiency of the system. Embodiments of the present invention also increase security while saving energy resources. In addition, embodiments of the invention enhance flexibility. Furthermore, embodiments of the present invention provide alternative methods, systems and non-transitory computer readable media for registering a mining computing entity or mining a new block in a PoS-based blockchain.

In an embodiment the present invention provides a method for registering a mining computing entity, 'MCE' with a trusted execution environment entity, 'TEEE' in a blockchain of a distributed blockchain consensus network, 'DBCN', based on a proof-of-stake protocol, said method comprising the steps of
Providing public signing and corresponding secret signing information and trusted time information by said TEEE of said MCE,
Providing public and secret account information for a virtual wallet of said blockchain by said MCE,
Generating integrity information by said TEEE,
Generating attestation information by signing said integrity information, hashed public signing information and public account information,
Computing proving information, by an attestation providing entity, 'APE', by attesting said attestation information,
Sending a transaction to said blockchain, signed with said secret account information, wherein said transaction including said public signing information and said proving information,
Verifying said transaction using said public account information and certificate information of said APE, and
Registering said MCE to said blockchain upon successful verification by providing an entry into the account as state of the blockchain comprising trusted information of the block comprising said transaction and amount information of the stake of the account.

In a further embodiment the present invention provides a method for registering a mining computing entity, 'MCE' with a trusted execution environment entity, 'TEEE' in a blockchain of a distributed blockchain consensus network, 'DBCN', based on a proof-of-stake protocol, said system comprising said MCE, an attestation providing entity, 'APE', and a node of said DCBN, wherein said TEEE of said MCE being adapted to
Provide public signing and corresponding secret signing information and trusted true information,
Generate integrity information,
Generate attestation information by signing said integrity information and hashed public signing information and public account information,
said MCE being adapted to
Provide public and secret account information,
Send a transaction to said blockchain, signed with said secret account information, wherein said transaction including said public signing information and proving information,
Register said MCE to said blockchain upon successful validation by providing an entry into the account as state of the blockchain comprising trusted information of the block comprising said transaction and amount information of the stake of the account.
said APE being adapted to
Compute proving information by attesting said attestation information,
said Node of said DCBN being adapted to
Validate said transaction using said public account information and certificate information of said APE.

In a further embodiment the present invention provides a non-transitory computer readable medium storing a program causing a computer to execute a method for registering a mining computing entity, 'MCE' with a trusted execution environment entity, 'TEEE' in a blockchain of a distributed blockchain consensus network, 'DBCN' based on a proof-of-stake protocol, 'POS', said method comprising the steps of
Providing public signing and corresponding secret signing information and trusted time information by said TEEE of said MCE,
Providing public and secret account information for a virtual wallet of said blockchain by said MCE,
Generating integrity information by said TEEE,
Generating attestation information by signing said integrity information, hashed public signing information and public account information,
Computing proving information, by an attestation providing entity, 'APE', by attesting said attestation information,
Sending a transaction to said blockchain, signed with said secret account information, wherein said transaction including said public signing information and said proving information,
Verifying said transaction using said public account information and certificate information of said APE, and
Registering said MCE to said blockchain upon successful verification by providing an entry into the account as state of the blockchain comprising trusted information of the block comprising said transaction and amount information of the stake of the account.

In a further embodiment the present invention provides a method for mining a new block in a blockchain of a distributed blockchain consensus network, 'DBCN' based on a proof-of-stake protocol, comprising the steps of:
Generating a new transaction including reference information of the most recent block of said blockchain by a peer of said blockchain, Validating, by a mining computing entity, 'MCE' with a trusted execution environment entity, 'TEEE', said new transaction by checking whether said most recent block refers to an active blockchain branch of said MCE, Upon successful validation of said transaction, initiating a request for new block generation, Comparing block height information of the block saved in said TEEE from the last block generation request with the block height information of the block of the actual block generation request, Providing trusted information by said TEEE of said MCE, Computing a block signature by said TEEE of said MCE using secret signing information of said TEEE of said MCE, Computing a new block including said block signature, the provided trusted time information and transaction information of said transaction, Computing differences between the trusted information of said new block and trusted information of said MCE when said MCE has been registered with said blockchain by a peer of said blockchain, Comparing said computed differences with one or more predefined security parameters and providing a result, and Adding the new block, by said peer, to the blockchain based on said result.

In a further embodiment the present invention provides a system for mining a new block in a blockchain of a distributed blockchain consensus network, 'DBCN', based on a proof-of-stake protocol, said system comprising a peer of said blockchain and a mining computing entity, 'MCE' with a trusted execution environment entity, 'TEEE', wherein said MCE is adapted to Initiate a request for new block generation upon successful validation of a transaction, Compute a new block including a block signature, provided trusted time information and transaction information of said transaction, said TEEE of said MCE is adapted to Validate a new transaction by checking whether a most recent block refers to an active blockchain branch of said MCE, Compare block height information of the block in the last block generation request with the block height information of the block of the actual block generation request, Provide trusted information, Compute a block signature using secret signing information of said TEEE of said MCE, and wherein said peer is adapted to Generate a new transaction including reference information of the most recent block of said blockchain, Compute differences between the trusted information of said new block and trusted time information of said MCE when said MCE has been registered with said blockchain, Compare said computed differences with one or more predefined security parameters and provide a result, and Add the new block to the blockchain based on said result.

In a further embodiment the present invention provides a non-transitory computer-readable medium storing a program causing a computer to execute a method for mining a new block in a blockchain of a distributed blockchain consensus network, 'DBCN' based on a proof-of-stake protocol, comprising the steps of:

Generating a new transaction including reference information of the most recent block of said blockchain by a peer of said blockchain, Validating, by a mining computing entity, 'MCE' with a trusted execution environment entity, 'TEEE', said new transaction by checking whether said most recent block refers to an active blockchain branch of said MCE, Upon successful validation of said transaction, initiating a request for new block generation, Comparing block height information of the block saved in said TEEE from the last block generation request with the block height information of the block of the actual block generation request, Providing trusted information by said TEEE of said MCE, Computing a block signature by said TEEE of said MCE using secret signing information of said TEEE of said MCE, Computing a new block including said block signature, the provided trusted time information and transaction information of said transaction, Computing differences between the trusted information of said new block and trusted information of said MCE when said MCE has been registered with said blockchain by a peer of said blockchain, Comparing said computed differences with one or more predefined security parameters and providing a result, and Adding the new block, by said peer, to the blockchain based on said result.

In a further embodiment the present invention provides a mining computing entity, 'MCE' with a trusted execution environment entity, 'TEEE', to be registered in a blockchain of a distributed blockchain consensus network, 'DBCN' based on a proof-of-stake protocol, wherein said TEEE of said MCE being adapted to Provide public signing and corresponding secret signing information and trusted time information, Generate integrity information, Generate attestation information by signing said integrity information, hashed public signing information and public account information, said MCE being adapted to Provide public and secret account information for a virtual wallet of said blockchain by said MCE, Send a transaction to said blockchain, signed with said secret account information, wherein said transaction including said public signing information and proving information, Register said MCE to said blockchain upon successful validation by providing an entry into the account as state of the blockchain comprising trusted information of the block comprising said transaction and amount information of the stake of the account.

At least one embodiment of the present invention may have the advantage of increasing the security: For instance the trusted time information provided by the TEEE enables preventing history attacks. At least one embodiment of the present invention may have the advantage to enhance the flexibility, since other proof-of-stake based protocols like Peercoin, etc. can be used, while at the same time security is enhanced. At least one embodiment of the present invention may have the advantage of being easily implemented, since nowadays corresponding devices can be easily or are per se equipped with a trusted execution environment. At least one embodiment of the present invention may have the advantage to increase the efficiency since other techniques to enhance security consume more energy.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The terms "computing entity", "mining computing entity", "trusted execution environment entity", "attestation providing entity", "peer", "computing device", "node" or the like refer in particular in the claims, preferably in the specification each to a device adapted to perform computing like a personal computer, a tablet, a mobile phone, a server, or the like and comprises one or more processors having one or more cores and may be connectable to a memory for storing one or more applications which is/are adapted to perform corresponding steps of one or more of the embodiments of the present invention. Any application may be software-based and/or hardware-based installed in the memory on which the processor(s) can work on. The devices, entities or the like may be adapted in such a way that the corresponding steps to be computed are performed in an optimized way. For instance different steps may be performed in parallel with a single processor on different of its cores. Further the entity/device may be identical forming a single computing device. The device(s)/entity(ies) may also be instantiated as a virtual device running on a physical computing resource. Different devices/entities may therefore be executed on said physical computing resource.

The term "trusted execution environment entity" or "TEEE" refers in particular in the claims, preferably in the specification to an entity, device or computing device isolating and protecting security-critical logic from all other hardware and software running on an entity or server. A trusted execution environment entity provides confidentiality and integrity protection for a trusted application running within a trusted execution environment respectively on said trusted execution environment entity, ensuring that no application running outside said trusted execution environment can interfere with the trusted application's operation. The trusted execution environment provided or spanned by a trusted execution environment entity may provide some form of remote attestation allowing remote users to certain the current configuration and behavior of a trusted application. The trusted execution environment may be provided in form of a central processing unit or the like.

The terms "resource" or "computational resource" are to be understood in their broadest senses and they each refer in particular in the claims, preferably in the specification to any kind of physical and/or virtual computational or compute resource, resource, device, entity or the like adapted to perform computing and which can be used by applications, services, users, etc. to perform certain functions, services, applications or the like. A computational resource may include but is not limited to computers, networks, memories, storages, etc. For instance a compute resource may be a CPU resource that is part of the servers inside the datacenter. Thus a server can have Compute like CPU (or vCPU), Network like Network Interface card (NIC), Memory like RAM and/or Storage like external/internal HDD(s).

The term "decentralized blockchain consensus network" is to be understood in the most general sense and refers in particular in the claims, preferably in the specification to a network having a plurality of nodes providing decentralized storage among said participating nodes in the network. Each node has preferably a copy either a light version or a full version of the chain of blocks, wherein each block may be a closed ledger to agree universally on the data status.

The term "blockchain" is to be understood, in particular in the claims, preferably in the description as a distributed database maintaining a continuously growing list of data records that are hardened against tampering and revision even by operators of the data storing nodes hosting database. A blockchain comprises for example two kinds of records: so-called transactions and so-called blocks. Transactions may be the actual data to be stored in the blockchain and blocks may be records confirming when and in what sequence certain transactions became journaled as a part of the blockchain database. Transactions may be created by participants, peers or miners and blocks may be created by users, miners or the like who may use specialized software or equipment designed specifically to create blocks. The term "blockchain" is e.g. identical to the Bitcoin blockchain as a digital currency introduced in 2008.

The term "mining" with regard to a "block" is to be understood in the most general sense and refers in particular in the claims, preferably in the specification to a distributed computational review process performed on each "block" of data in a "blockchain". This allows for achievement of consensus in an environment where neither party knows or trusts each other. "Mining" is performed by a "miner", here by a mining computing entity.

The terms "validating" and "verifying" are to be understood in their broadest sense and refer in particular in the claims, preferably in the specification each to a procedure performing reviewing, investigating, (re)checking, controlling, confirming, (re)assuring, attesting, affirming, certifying, etc.

The term "integrity" with respect to any kind of data, information, message, share or the like is to be understood in its broadest sense and refers in particular in the claims, preferably in the specification to the completeness, intactness, inviolacy, inviolability, etc. of said data, information, message, share or the like.

The term "signing" with regard to a "block" is to be understood in the most general sense and refers in particular in the claims, preferably in the specification to data in electronic form being associated with linked or connected to other data in electronic form and being used by the computing entity to sign.

The term "miner" is to be understood in the most general sense and refers in particular in the claims, preferably in the specification to an individual, person, user or the like who runs a mining computing entity, e.g. for instance to repeatedly calculate hashes with the intention to create a successful block in a PoW based blockchain and to earn coins from transaction fees and new coins created with the block itself.

The term "block information" is to be understood in the most general sense and refers in particular in the claims, preferably in the specification to information related, describing or specifying information of properties of a block of a blockchain.

The term "block height information" is to be understood in the most general sense and refers in particular in the claims, preferably in the specification to information related to, describing or specifying the height, preferably the size, of a block of a blockchain.

The term "public signing information" is to be understood in the most general sense and refers in particular in the claims, preferably in the specification to public information, data or the like in electronic form, which is logically associated with other data in electronic form and which is used by a signatory to sign.

The term "secret signing information" is to be understood in the most general sense and refers in particular in the claims, preferably in the specification to secret information, data or the like in electronic form, which is logically associated with other data in electronic form and which is used by a signatory to sign.

The term "public account information" is to be understood in the most general sense and refers in particular in the claims, preferably in the specification to public information, data or the like in electronic form granting restricted access to an account of a wallet.

The term "secret account information" is to be understood in the most general sense and refers in particular in the claims, preferably in the specification to secret information, data or the like in electronic form granting access to an account of a wallet.

The term "wallet" is to be understood in the most general sense and refers in particular in the claims, preferably in the specification to an electronic device, online service or the like that allows an individual operating another device to make electronic transactions.

The term "integrity information" is to be understood in the most general sense and refers in particular in the claims, preferably in the specification to information, data or the like in electronic form which is logically associated with other data in electronic form and provides information about the integrity of said other data, which can be checked.

The term "hashing" is to be understood in the most general sense and refers in particular in the claims, preferably in the specification to computing a hash function being any function that can be used to map data of arbitrary size to data of a fixed size.

The term "attestation information" is to be understood in the most general sense and refers in particular in the claims, preferably in the specification to information, data or the like, in electronic form which is logically associated with other data in electronic form and providing information about a result of an attestation method, procedure or process of said other data.

The term "proving information" is to be understood in the most general sense and refers in particular in the claims, preferably in the specification to information, data or the like, in electronic form which is logically associated with other data in electronic form and providing information about a result of a proving method, procedure or process of said other data.

The term "certificate information" is to be understood in the most general sense and refers in particular in the claims, preferably in the specification to information, data or the like, in electronic form which is logically associated with other data in electronic form and providing information about integrity and authenticity of said other data.

The term "amount information" is to be understood in the most general sense and refers in particular in the claims, preferably in the specification to information, data or the like, in electronic form which is logically associated with other data in electronic form and providing information about amount, state, quantity, portion, volume of said other data.

The term "stake" is to be understood in the most general sense and refers in particular in the claims, preferably in the specification to information, data or the like, in electronic form which is logically associated with other data in electronic form indicating a part, portion or the like of a certain defined limited amount.

The term "reference information" is to be understood in the most general sense and refers in particular in the claims, preferably in the specification to information, data or the like, in electronic form which is logically associated with other data in electronic form and providing linking or pointing to said other data.

Further features, advantages and further embodiments are described or may become apparent in the following:

Said public signing information and corresponding secret signing information may be computed as public key/secret key pair. This enables a fast and secure way to provide signing information.

Said MCE and said APE may be connected via a bootstrap node. This enables in an easy way to redirect attestation information to or from an attestation service provider without having said MCE to directly connect to said APE.

Said new transaction may be validated by checking whether said new transaction includes reference information to a block belonging to the active blockchain branch of said MCE and/or by validating certificate information, said certificate information indicating integrity and authenticity of content of said new transaction. This increases the security while saving computational resources since only verified transactions are further processed by the MCE.

Said trusted time information may indicate an elapsed time starting from an initial time since registration of said MCE in said blockchain. This enables in a fast and simple way to provide trusted time information.

Eligibility information of the MCE may be checked prior to computing a new block based on account information and POS-stake of said MCE. This ensures that the MCE is entitled to generate or compute a new block, thus security is enhanced.

Said eligibility information may be computed by said TEEE of said MCE. This further enhances the security.

Said TEEE may save block information of all confirmed blocks of a fork of said blockchain by said blockchain. This ensures that said MCE can only work on one fork and cannot work on other forks while working on said one fork. Therefore security is further increased.

Said MCE may be adapted to provide a TEEE app running inside said TEEE and a miner app running outside said TEEE, wherein both apps running on said MCE and wherein said TEEE app and said miner app are adapted to exchange data. This enables a flexible and easy-to-implement communication between the TEEE and the components of said MCE outside the TEEE.

In the following FIGS. 1-6 a public blockchain model is assumed. The blockchain network comprises a plurality of distributed nodes, who run a client application for peer-to-peer connection(s). The transactions are broadcasted into the blockchain network for public validation; a mining node then organizes the validated transactions into blocks, and mines the next legitimate block to be included into the blockchain. The mining protocol, which is executed by all miners and validated by all nodes, brings consensus to the transaction history in this distributed system. Miners may join and leave at any time in the process or the blockchain network respectively. Even further a computing entity 'MCE' is used to mine blocks in a proof of stake blockchain. The MCE comprises a trusted execution environment entity capable of providing a timestamp with a trusted elapsed time. A timestamp is trusted in a way that the elapsed time between any two timestamps can be trusted, i.e., any reset of the 'MCE' in order to manipulate the timestamp can be detected when comparing the new timestamp with the last obtained one. The capability for remote attestation and sealing stays the same as TEEE has specified with a provisioned attestation key ($sk_{attest}$, $pk_{attest}$) and a sealing key ($sk_{seal}$, $pk_{seal}$) protected by the hardware of said TEEE.

It is further assumed that some of the blockchain miners or third party nodes are registered by a TEEE attestation service provider, and serve as bootstrap nodes for the rest of the miners to forward their remote attestation requests. It is further assumed that all users in the blockchain trust the certificate of the TEEE attestation service provider.

Further a miner application running on the MCE performs transaction validation, block preparation, and block generation. A transaction validation process verifies the transactions received from the network and a block preparation process groups of validated transactions into a block and creates a corresponding block header covering such information as: previous block hash, timestamp, transaction Merkle tree root, difficulty, etc. The block generation process tests the eligibility of the miner to generate a block and provides a block signature if so. In the following figures, only the block generation shall be performed by the trusted app protected by TEEE, while the rest shall be handled by the miner app outside of TEEE. However, also other processes can be shifted to be performed by the TEEE app instead of the miner app outside the TEEE.

FIG. 1 shows steps of a method according to an embodiment of the present invention.

In detail FIG. 1 shows the steps of registering a trusted app binding to a miner app account to the blockchain network.

In the preferred embodiment according to FIG. 1, the user sets up a trusted execution environment entity TEEE. A trusted app for mining in the blockchain is started with an initialization and registration procedure which described as follows:

In a first step 1-1 the trusted app generates a signing key pair ($sk_{TEE}$, $pk_{TEE}$) and retrieves the trusted timestamp $t_{TEE}^0$. The miner app provides a wallet account public key $pk_{acct}$ to the trusted app.

In a second step 1-2 the trusted app connects a bootstrap node and sends the quote of his computed attestation report signed by the TEEE $\text{Sign}_{sk_{attest}}(MR, H(Pk_{acct}, pk_{TEE}))$, where MR is the integrity measurement report of the application by the TEEE, and H(•) is a hash function.

In a third step 1-3 the bootstrap node forwards the quote to the TEE attestation service provider and obtains a signed attestation status result: $\text{Sign}_{TEE\_Provider}(MR, H(pk_{acct}, pk_{TEE}), \text{result})$ from the TEE attestation service provider as an attestation proof AF, where result is from the TEE attestation service.

In a fourth step 1-4 the miner app registers the trusted app to the blockchain using the attestation proof to become a valid miner. To do this, the miner app sends a registration transaction signed with its wallet account private key $sk_{acct}$ with payload (AF, $pk_{TEE}$).

In a fifth step 1-5 the blockchain network verifies this registration transaction using the account public key $pk_{acct}$ and TEE attestation service provider's certificate. If the transaction is valid, an entry of $pk_{acct}$:($stake_{acct}$, $pk_{TEE}$, $t_r$) as the state of the blockchain is performed, where $t_r$ is the timestamp of the block containing the registration transaction, where $stake_{acct}$ is the amount of stake related to the account $pk_{acct}$.

In an optional sixth step 1-6 if a miner loses control of his TEEE, e.g., destroyed or stolen, steps 1-1 to 1-4 may be repeated to initialize and register the trusted app of a new device to the blockchain. The other users will update the entry to $pk_{acct}$: ($stake_{acct}$, $pk'_{TEE}$, $t_r'$), where ($pk'_{TEE}$) is initialized by the new trusted app.

Figure 2:
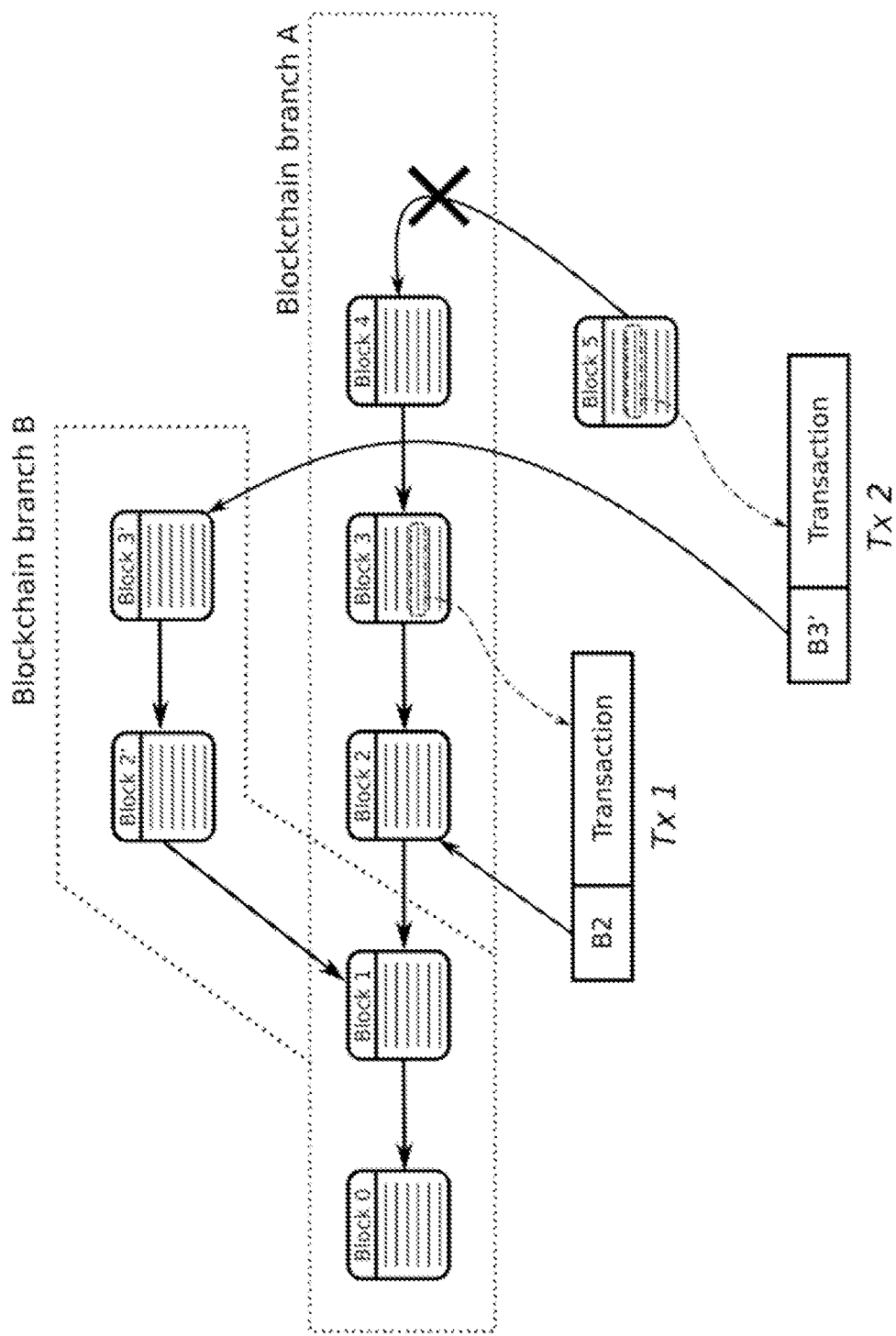
FIG. 2 shows steps of a method according to an embodiment of the present invention.

FIG. 2 shows steps of a method according to an embodiment of the present invention.

In detail FIG. 2 shows a transaction validation procedure for different branches of the blockchain.

Transactions are preferably provided in the form (action, arguments, $\text{Hash}_{block}$, $pk_{sender}$, Sig) where action and arguments represent the nomenclature of how transactions operate on the blockchain, $\text{Hash}_{block}$ is the hash of a recent block of the blockchain maintained by the peer, $pk_{sender}$ is the public key corresponding to the account of the peer, and Sig the signature attesting all the other fields.

A transaction received by a miner is valid if
 a) $\text{Hash}_{block}$ the hash of a block that belongs to the blockchain branch maintained by the miner as shown in FIG. 2 and it is not earlier than σ blocks comparing to the latest block, for a security parameter σ and
 b) Sig is a valid signature based on $pk_{sender}$ that verifies the integrity and authenticity of all the other fields.

In FIG. 2 for instance transaction Tx1 can be included in block 3 on branch A maintained by the miner, as it refers to block 2. block 5 that contains transaction Tx2, however, cannot be included in branch A, as transaction Tx2 refers to block 3' in branch B.

Figure 3:
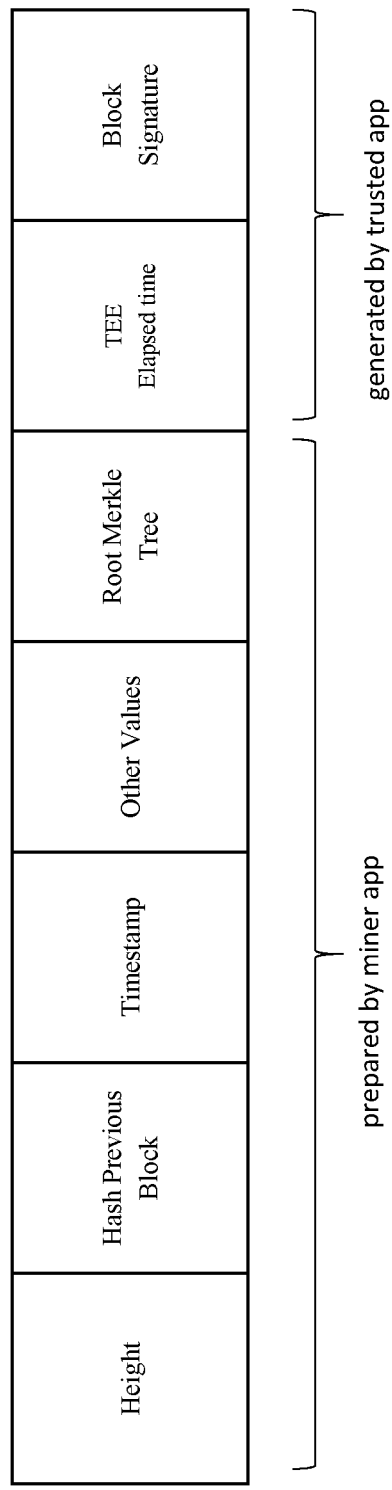
FIG. 3 shows steps of a method according to an embodiment of the present invention.

FIG. 3 shows steps of a method according to an embodiment of the present invention.

In detail FIG. 3 shows a block header according to an embodiment of the present invention. The shown block header comprises the height of the block, the hash value of the previous block, a timestamp, the root of the Merkle tree of the blockchain, and other values. These afore-mentioned values are provided by the miner app.

The block header comprises further the TEEE elapsed time, i.e. the time since registration of the TEEE in the blockchain and the block signature. These two values are computed and provided by the trusted app running inside the TEEE.

Figure 4:
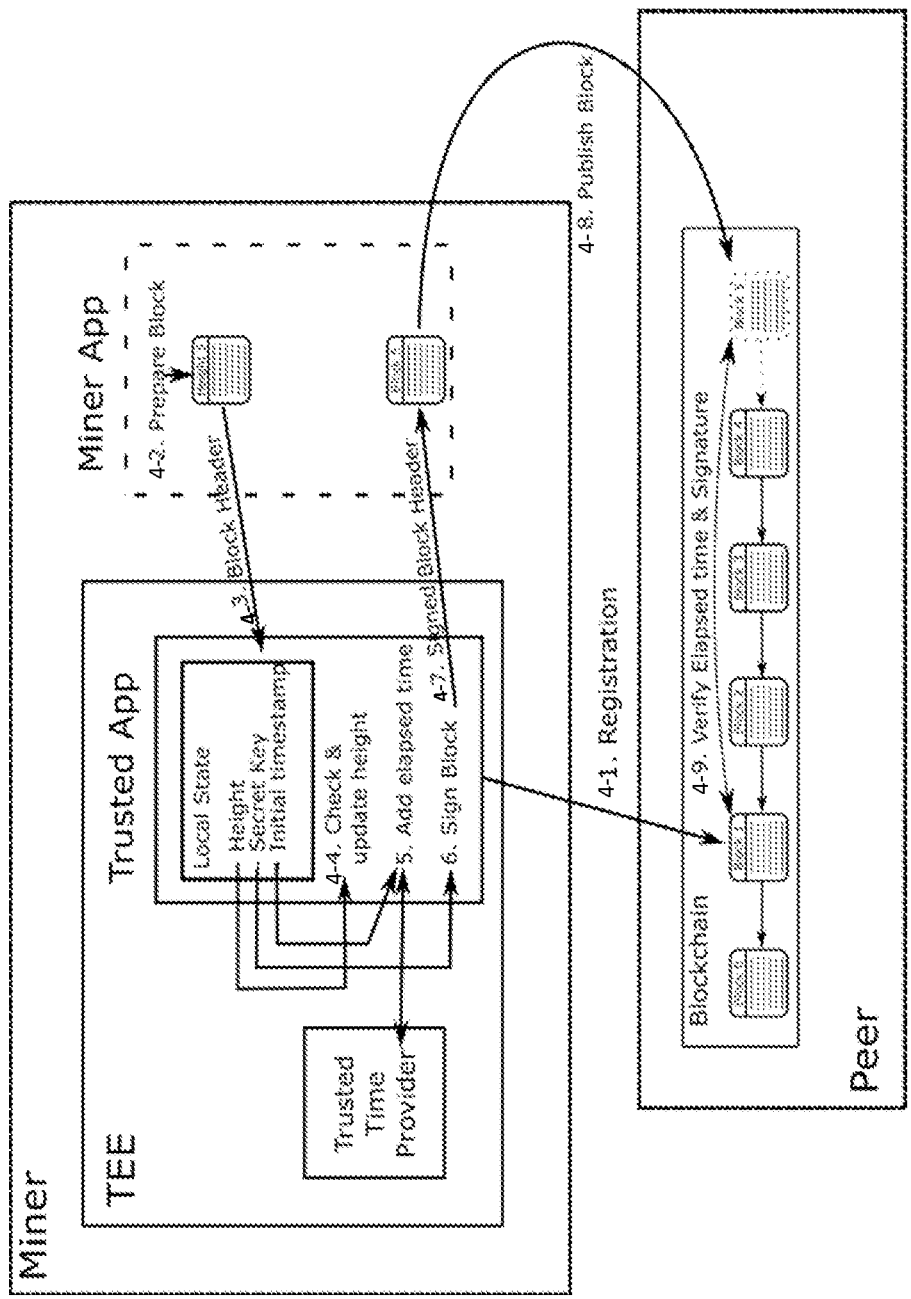
FIG. 4 shows steps of a method according to an embodiment of the present invention.

FIG. 4 shows steps of a method according to an embodiment of the present invention.

In detail FIG. 4 shows the steps of mining a new block according to an embodiment of the present invention.

The first step 4-1 corresponds to the registration procedure as shown in FIG. 1.

In a further step 4-2 once a miner has verified all the received transactions, the miner includes them in a block through the block preparation process. This process returns a block header with all the fields filled except for the TEE elapsed time and the block signature as shown in FIG. 3.

The miner then supplies the prepared block header to the trusted app in a further 4-3 step and starts the block generation process. The trusted app first tests the eligibility of the miner according to pre-defined algorithm based on the miner's stake, his account information and the current blockchain. If the miner is eligible to create the next block, the trusted app provides a valid block signature and the TEE trusted elapsed time so the block header according to FIG. 3 is complete.

In the following the block generation process is described as depicted in FIG. 4:

At all time, the trusted app keeps the following variables in its memory:
 The block height of the last block generation request $v_h$
 The private key $sk_{TEE}$ registered on the blockchain
 The registration timestamp $t_{TEE}^0$ The miner app first submits a block generation request at height h' to the trusted app by supplying a block header.

The trusted app compares in a further step 4-4 the block height of the new request h' with the last recorded height $v_h$. If $v_h$<h', the trusted app updates the block height value to h' and continues; otherwise the request is dropped.

The trusted app computes in a further step 4-5 the trusted elapsed time $\Delta t_{TEE}$ using $t_{TEE}^0$ and a trusted time provider and adds it to the block header. If the trusted app detected that there is a time reset occurred since $t_{TEE}^0$, the block signature process is dropped.

The trusted app signs the block header in a further step 4-6 using its private key $sk_{TEE}$. The block signature may include an eligibility proof.

If the block generation process succeeded, the miner can then broadcast the block to the other peers depicted in FIG. 4, step 4-8.

Every peer receiving the new block will perform a block verification process in a further step 4-9:

The peer first verifies the transactions in the block and if the block header is correctly formatted. The transactions may all comprise a reference to a recent previous block that is included in the blockchain of the recipient peer.

Based on the saved state of all registered miners, the peer retrieves the state related to the miner of the received block $pk_{acct}$: ($stake_{acct}$, $pk_{TEE}$, $t_r$)

The peer verifies the block signature using the public key of the miner trusted app $pk_{TEE}$.

The peer checks if the timestamp of the block can be accepted:

The peer computes the elapsed time between the registration block of the miner and the received block: $\Delta t = t_b - t_r$.

The peer compares this elapsed time of the blocks $\Delta t$ with the trusted elapsed time of the TEE $\Delta t_{TEE}$. If the difference $|\Delta t - \Delta t_{TEE}| < \sigma_2$ with $\sigma_2$ a security parameter, then the block timestamp is accepted.

If all the steps 4-1-4-9 succeeded, then the block is deemed valid and added to the blockchain by the recipient peer.

Figure 5:
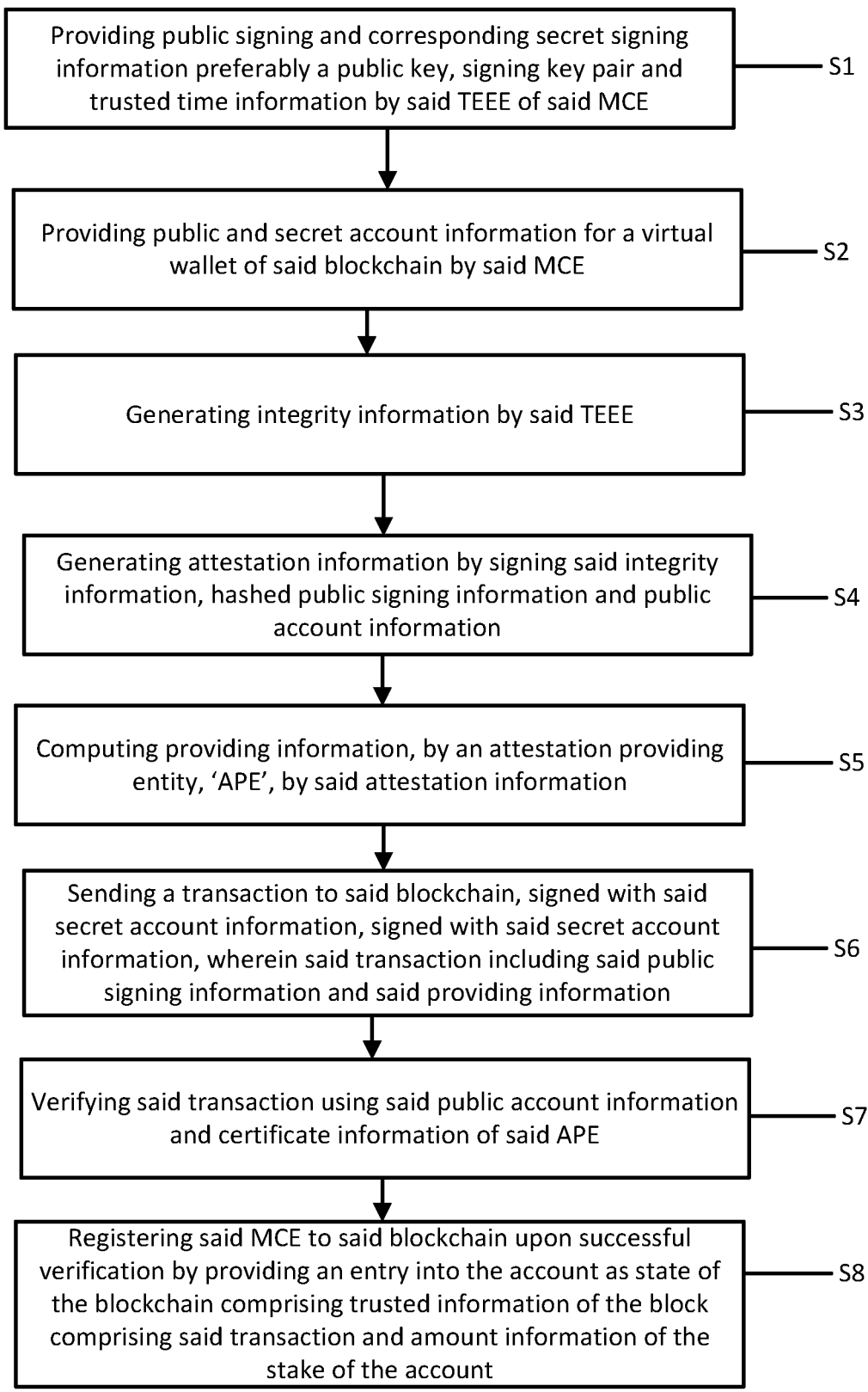
FIG. 5 shows steps of a method according to an embodiment of the present invention.

FIG. 5 shows steps of a method according to an embodiment of the present invention.

FIG. 5 shows in detail steps of a method for registering a mining computing entity, 'MCE' with a trusted execution environment entity, 'TEEE' in a blockchain of a distributed blockchain consensus network, 'DBCN', based on a proof-of-stake protocol. The method comprises the following steps:

A first step S1 is carried out providing public signing and corresponding secret signing information preferably a public key, signing key pair and trusted time information by said TEEE of said MCE.

A further step S2 is carried out providing public and secret account information for a virtual wallet of said blockchain by said MCE.

A further step S3 is carried out generating integrity information by said TEEE.

A further step S4 is carried out generating attestation information by signing said integrity information, hashed public signing information and public account information.

A further step S5 is carried out computing proving information, by an attestation providing entity, 'APE', by attesting said attestation information.

A further step S6 is carried out sending a transaction to said blockchain, signed with said secret account information, wherein said transaction including said public signing information and said proving information.

A further step S7 is carried out verifying said transaction using said public account information and certificate information of said APE A further step S8 is carried out registering said MCE to said blockchain upon successful verification by providing an entry into the account as state of the blockchain comprising trusted information of the block comprising said transaction and amount information of the stake of the account.

Figure 6:
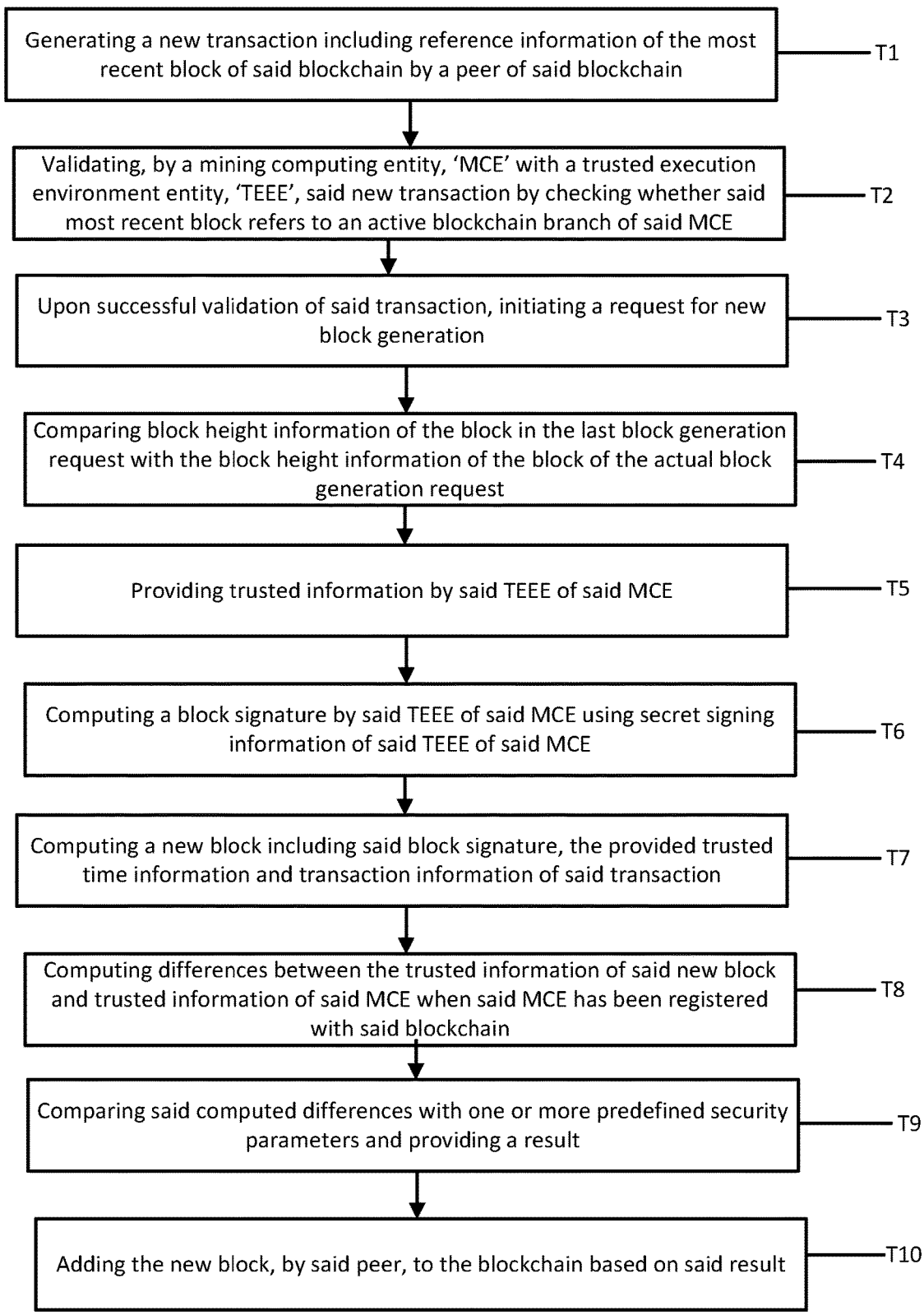
FIG. 6 shows steps of a method according to an embodiment of the present invention.

FIG. 6 shows steps of a method according to an embodiment of the present invention.

FIG. 6 shows in detail steps of a method for mining a new block in a blockchain of a distributed blockchain consensus network, 'DBCN' based on a proof-of-stake protocol. The method comprises the following steps:

A first step T1 is carried out generating a new transaction including reference information of the most recent block of said blockchain by a peer of said blockchain.

A further step T2 is carried out validating, by a mining computing entity, 'MCE' with a trusted execution environment entity, 'TEEE', said new transaction by checking whether said most recent block refers to an active blockchain branch of said MCE.

A further step T3 is carried out upon successful validation of said transaction, initiating a request for new block generation.

A further step T4 is carried out comparing block height information of the block in the last block generation request with the block height information of the block of the actual block generation request.

A further step T5 is carried out providing trusted information by said TEEE of said MCE.

A further step T6 is carried out computing a block signature by said TEEE of said MCE using secret signing information of said TEEE of said MCE.

A further step T7 is carried out computing a new block including said block signature, the provided trusted time information and transaction information of said transaction.

A further step T8 is carried out computing differences between the trusted information of said new block and trusted information of said MCE when said MCE has been registered with said blockchain.

A further step T9 is carried out comparing said computed differences with one or more predefined security parameters and providing a result.

A further step T10 is carried out adding the new block, by said peer, to the blockchain based on said result.

Figure 7:
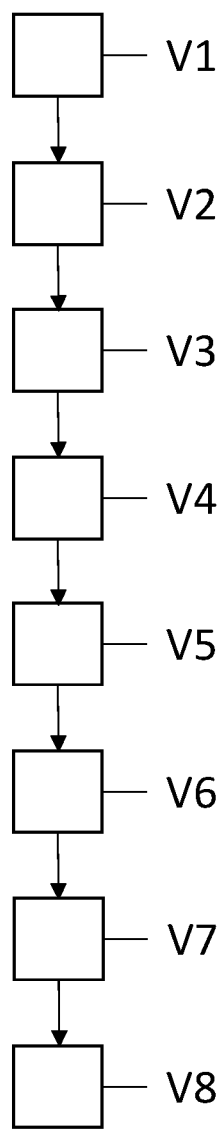
FIG. 7 shows steps of a method according to an embodiment of the present invention.

FIG. 7 shows steps of a method according to an embodiment of the present invention.

FIG. 7 shows in detail steps of a method for mining blocks in a proof of stake blockchain. The method comprises the following steps:

A first step V1 is carried out generating a key pair and initializing trusted timestamp within the trusted app.

A further step V2 is carried out attesting a trusted app in a trusted execution environment optionally via a bootstrap node.

A further step V3 is carried out registering the miner to the blockchain by binding the account key of the peer with the trusted app key along with the remote attestation proof, and recording the registration timestamp.

A further step V4 is carried out including the reference to the most recent block in a new transaction.

A further step V5 is carried out verifying transactions and checking if the transactions refer to blocks that belong to the active working branch of the peer.

A further step V6 is carried out by the trusted app verifying and updating the recorded block height and rejecting any request with an obsolete block height upon a block generation request.

A further step V7 is carried out by the trusted app providing a trusted elapsed time and signing the block.

A further step V8 is carried out upon a new block, validating the transactions and the block header, computing the elapsed time between the new block and the registration block of the block miner, comparing the computed elapsed time with the trusted elapsed time signed by the trusted app, and accepting the new block.

In summary, one or more embodiments of the present invention can provide or enable:
1) Binding a blockchain user to a single branch of the block chain by registering a trusted time anchor with a trusted execution environment to the blockchain.
2) Leveraging a trusted clock counter to make the blockchain history immutable even in the absence of Proof of Work.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for registering a mining computing entity (MCE) with a trusted execution environment entity (TEEE) in a blockchain of a distributed blockchain consensus network (DBCN), based on a proof-of-stake protocol, the method comprising:
    determining, by the MCE, public signing information, secret signing information, and a registration timestamp;
    determining, by the MCE, public account information and secret account information for a virtual wallet of the blockchain;
    generating, by the MCE, attestation information based on signing integrity information and hashing the public signing information and the public account information;
    based on the attestation information, obtaining, by the MCE and from an attestation providing entity (APE), proving information;
    sending, by the MCE and to the blockchain, a registration transaction that is signed with the secret account information, wherein the registration transaction comprises the public signing information and the proving information from the APE; and
    registering, by the MCE, the MCE to the blockchain based on the registration transaction.

2. The method of claim 1, wherein determining the public signing information and the secret signing information comprises computing a signing public key and a signing secret key as a key pair.

3. The method of claim 2, wherein the public account information is a wallet account public key and the private account information is a wallet account private key.

4. The method of claim 1, wherein the MCE and the APE are connected via a bootstrap node.

5. The method of claim 1, further comprising:
    generating the integrity information, wherein the attestation information comprises the signed integrity information, the hashed public signing information, and the hashed public account information.

6. The method of claim 1, further comprising:
    sending, by the MCE and to the APE, the attestation information, wherein the proving information is based on attesting the attestation information, and wherein the proving information indicates an attestation proof from the APE.

7. The method of claim 1, wherein the registration transaction is verified using the public account information and certificate information associated with the APE, and registering the MCE to the blockchain comprises providing an entry into an account as a state of the blockchain, wherein the entry comprises trusted information of the block comprising transaction and amount information of a stake of the account.

8. The method of claim 7, further comprising:
    based on losing control of the TEEE of the MCE, updating the entry using new public signing information that is generated by a new MCE.

9. The method of claim 7, wherein the entry comprises a timestamp of the block indicating the registration transaction.

10. The method of claim 1, further comprising:
    initiating, by the MCE, a request for new block generation;
    computing, by the MCE, a block signature using the secret signing information; and
computing, by the MCE, a new block, wherein the new block comprises the block signature, a trusted elapsed time, and transaction information.

11. The method of claim 10, wherein the new block is validated based on a difference between the trusted elapsed time of the new block and an elapsed time of the new block.

12. The method of claim 11, wherein the trusted elapsed time of the new block is based on a trusted time provider and the registration timestamp, and wherein the elapsed time of the new block is based on an interval between when the new block was received and an initial time of registration of the MCE associated with the registration transaction.

13. The method of claim 10, further comprising:
    prior to computing the new block, checking eligibility information of the MCE, wherein the eligibility information is computed by the TEEE of the MCE.

14. The method of claim 1, wherein the TEEE saves block information of all confirmed blocks of a branch of the blockchain.

15. The method of claim 1, wherein the registration transaction further comprises the attestation information.

16. A mining computing entity (MCE) with a trusted execution environment entity (TEEE), wherein the MCE is in a blockchain of a distributed blockchain consensus network (DBCN), the MCE comprising one or more hardware processors, which, alone or in combination, are configured to provide for execution of the following steps:
- determining public signing information, secret signing information, and a registration timestamp;
- determining public account information and secret account information for a virtual wallet of the blockchain;
- generating attestation information based on signing integrity information and hashing the public signing information and the public account information;
- based on the attestation information, obtaining, from an attestation providing entity (APE), proving information;
- sending, to the blockchain, a registration transaction that is signed with the secret account information, wherein the registration transaction comprises the public signing information and the proving information from the APE; and
- registering the MCE to the blockchain based on the registration transaction.

17. The MCE of claim 16, wherein determining the public signing information and the secret signing information comprises computing a signing public key and a signing secret key as a key pair.

18. The MCE of claim 16, wherein the public account information is a wallet account public key and the private account information is a wallet account private key.

19. The MCE of claim 16, wherein a bootstrap node of the DBCN connects the MCE to the APE.

20. A non-transitory computer readable medium storing a program configured to cause a computer to execute a method for registering a mining computing entity (MCE) with a trusted execution environment entity (TEEE) in a blockchain of a distributed blockchain consensus network (DBCN) based on a proof-of-stake protocol (POS), the method comprising:
- determining public signing information, secret signing information, and a registration timestamp;
- determining public account information and secret account information for a virtual wallet of the blockchain;
- generating attestation information based on signing integrity information and hashing the public signing information and the public account information;
- based on the attestation information, obtaining, from an attestation providing entity (APE), proving information;
- sending, to the blockchain, a registration transaction that is signed with the secret account information, wherein the registration transaction comprises the public signing information and the proving information from the APE; and
- registering the MCE to the blockchain based on the registration transaction.

* * * * *